United States Patent
Mathur (10) Patent No.: US 11,003,662 B2
(45) Date of Patent: May 11, 2021

(54) TRIGGER-FREE ASYNCHRONOUS MAINTENANCE OF CUSTOM INDEXES AND SKINNY PERFORMANCE META-STRUCTURES

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 247 days.

(21) Appl. No.: 15/798,077

(22) Filed: Oct. 30, 2017

(65) Prior Publication Data

US 2019/0130002 A1    May 2, 2019

(51) Int. Cl.
*G06F 16/23* (2019.01)
*G06F 16/2455* (2019.01)
*G06F 16/215* (2019.01)
*G06F 16/22* (2019.01)

(52) U.S. Cl.
CPC ........ *G06F 16/2455* (2019.01); *G06F 16/215* (2019.01); *G06F 16/2272* (2019.01); *G06F 16/2282* (2019.01); *G06F 16/2365* (2019.01)

(58) Field of Classification Search
CPC .............. G06F 16/283; G06F 16/2365; G06F 16/3331; G06F 16/2455
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

Lin et al., Tenzing—A SQL Implementation on the MapReduce Framework:, 2011, Very Large Data Bases Endowment. (Year: 2011).*
U.S. Appl. No. 13/986,251, filed Apr. 16, 2013.

*Primary Examiner* — Apu M Mofiz
*Assistant Examiner* — Sheryl L Holland
(74) *Attorney, Agent, or Firm* — Dergosits & Noah LLP; Todd A. Noah (57) ABSTRACT

Trigger-free asynchronous maintenance of custom indexes and skinny performance meta-structures is described. A database system receives a request to manipulate data in an object in a database table, and determines whether the object in the database table is associated with a user-based data structure. If the object in the database table is associated with the user-based data structure, the database system manipulates the data in the object in the database table and data in an object in an intermediate data table. The database system receives a query, and determines whether the query requests any data that is in the user-based data structure. If the query requests any data that is in the user-based data structure, the database system creates a query result by combining any data that is in the object in the intermediate data table with any requested data that is in the user-based data structure, and outputs the query result.

20 Claims, 5 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,591,272 B1* | 7/2003 | Williams .............. G06F 16/289 |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,289,723 B1* | 5/2019 | Cai ..................... G06F 16/2456 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0133401 A1* | 9/2002 | Mount .................. G06Q 30/02 705/14.36 |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0187977 A1* | 8/2005 | Frost .................... G06F 16/278 |
| 2005/0223022 A1* | 10/2005 | Weissman ...... G06Q 10/063112 |
| 2007/0180086 A1* | 8/2007 | Fang .................. H04L 41/0213 709/223 |
| 2008/0027788 A1* | 1/2008 | Lawrence .............. G06Q 30/02 705/7.33 |
| 2008/0082540 A1* | 4/2008 | Weissman ........... G06F 21/6227 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0246449 A1* | 10/2011 | Collins ............. G06F 16/24542 707/715 |
| 2011/0258179 A1* | 10/2011 | Weissman ......... G06F 16/24544 707/714 |
| 2011/0295838 A1* | 12/2011 | Collins ................ G06F 16/2428 707/715 |
| 2012/0173516 A1* | 7/2012 | Waas ................ G06F 16/24524 707/718 |
| 2012/0233137 A1 | 9/2012 | Jakobson et al. |
| 2012/0233176 A1* | 9/2012 | Korn .................. G06F 21/6227 707/747 |
| 2013/0018890 A1* | 1/2013 | Rajan .................. G06F 16/2272 707/741 |
| 2013/0054568 A1* | 2/2013 | Chen .................. G06F 16/2455 707/714 |
| 2013/0138524 A1* | 5/2013 | Sharma .............. G06Q 30/0601 705/26.1 |
| 2013/0218948 A1 | 8/2013 | Jakobson |
| 2013/0218949 A1 | 8/2013 | Jakobson |

(56) References Cited

U.S. PATENT DOCUMENTS

| | | |
|---|---|---|
| 2013/0218966 A1 | 8/2013 | Jakobson |
| 2014/0317093 A1* | 10/2014 | Sun .................... G06F 16/2255 |
| | | 707/722 |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0179916 A1* | 6/2016 | Messer .................. G06F 16/27 |
| | | 707/636 |

\* cited by examiner

TRIGGER-FREE ASYNCHRONOUS MAINTENANCE OF CUSTOM INDEXES AND SKINNY PERFORMANCE META-STRUCTURES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Figure 1:
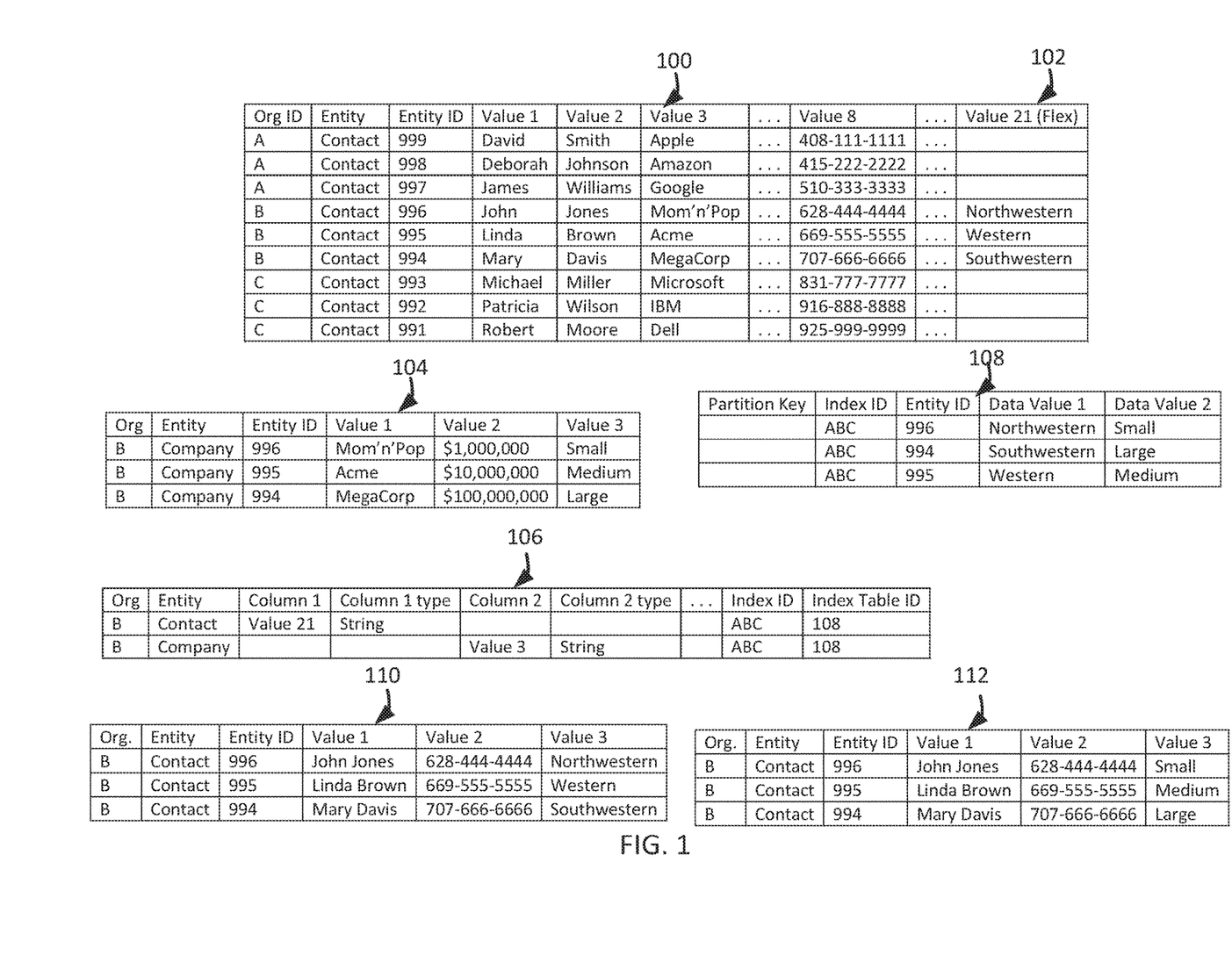
FIG. 1 illustrates a block diagram of a simplified example of a database table.

A database system can store information in digital objects, such as a database that stores digital objects for each contact, which is a person who may be able to help in achieving a goal. An object can be a digital entity that can store information, such as a contact's given name, family name, job title, employer name, street address, city, state, zip code, e-mail address, and telephone number. FIG. 1 illustrates a block diagram of a simplified example of a multi-tenant database table 100, in which organization A, organization B, and organization C each store the names, employers, and telephone numbers for 3 of their organization's contacts. A database table can be a digital structure that stores information. A multi-tenant database can be an architecture in which a single instance of a software application retains information for many organizations, which may be referred to as tenants. While the database table 100 stores 3 rows of data for each of 3 organizations, the database table 100, which may be referred to as the base table 100, may store any number of rows for any number of organizations.

Database users may create custom fields and/or custom objects to store non-standard information. For example, FIG. 1 depicts that organization B has created the custom field sales regions 102 for organization B's contacts, which stores data in a "flex" column 102 of the base table 100, to record organization B's geographical sales region that is associated with each contact. The flex column 102 could be in the base table 100 or another table. The data type of the value to be stored in the flex column 102 undergoes a lossless conversion before being stored in the flex column 102. Although this example describes only one organization storing only one type of data in only one flex column, other organizations can store the same or other types of data in the same flex column or other flex columns. In another example, FIG. 1 depicts that organization B created the custom object company 104 to record company information associated with various contacts, instead of using the standard object for Accounts because organization B does not yet have an account with some of the contact's employers, and created a new field for company size, which stores data that is based on the base table 100's standard value for revenue. Although these examples depict that a database system has created 1 custom field 102 and 1 custom object 104 for a multi-tenant database, the database system can create any number of custom fields and any number of custom objects for a multi-tenant database or for a single organization's database. Furthermore, a database system may store metadata to create virtual columns, such as column 102, for custom fields and to create virtual tables, such as table 104, for custom objects.

A database system can collect, parse, and store data from a database into an index to facilitate fast and accurate information retrieval. For example, a database system stores the base table 100's standard information for contacts into standard search engine indexes that enable each organization's users to search for their organization's contacts by specifying all or parts of their contacts' standard information. Similar to the example for the base table 100's standard information and standard indexes, a database system can create custom index metadata 106 to enable the storing of the base table 100's custom field 102 information for sales regions and the database table 104's custom information for company size into custom index 108, which enables organization B's users to search for their organization's contacts by specifying all or parts of their contacts' standard information and/or custom information. A custom index can be an ordered list of objects, with references to the locations where the objects are stored. For example, the custom index metadata 106 for organization B specifies that value 21 for organization B's contact entity and value 3 for organization B's company entity are stored in data value columns 1 and 2 of the custom index ABC. Continuing this example, the custom index 108 stores the data values "Large," "Medium," "Northwestern," "Small," "Southwestern," and "Western" with their corresponding entity identifiers, which enables a search engine that is searching for an object that stores the value "Northwestern" to identify entity 996 in the base table #100, which stores John Jones' contact information. A custom index may be referred to as a user-based data structure because a database system and/or a user of the database system creates a custom index to optimize database searches by users of the database system. While this example depicts 1 custom index 108 that stores 3 rows of data, the database system and/or a user of the database system can create any number of custom indexes, with each custom index storing any number of rows of data. Even though this example describes the custom index 108 that is based on a custom field and a custom object, database systems and/or users can create a custom index based on a standard object. For example, if a database system does not have an index that enables searching the standard object for job titles, a database user can create a custom index that enables searching the standard object for job titles.

The amount of resources expended by a multi-tenant database system on searching for data may be affected by the number of tenants and the number of columns that store data in a multi-tenant database. For example, if a database system accesses the base table 100 that stores data for 3 organizations, the database system might access 24 columns of data to retrieve a few columns of data for any 1 of the 3 organizations. Furthermore, if a database system accesses a database that stores data for 1,000's of organizations, the database system might access 1,000's of columns of data to retrieve only a few columns of data for any 1 of the 1,000's of organizations. Accessing 1,000's of columns of data to retrieve a few columns of data may not be the optimal use of a database system's resources.

Consequently, a database system may create a copy of a tenant-based subset of a multi-tenant database to enable optimized searching of frequently searched data. A copy of a tenant-based subset can be a duplicate of an organization's part of a larger group of objects stored for many organizations. A copy of a tenant-based subset may be referred to as a user-based data structure because a query optimizer creates a copy of a tenant-based subset to optimize database searches by users of a database system. For example, since organization B's users frequently specify either the sales region or the company size to search for a contact's name and phone number, a database system creates the copies of the tenant-based subsets 110 and 112 based on the base table 100. If an organization B user specifies a sales region when searching for contact names and phone numbers, a query optimizer in the database system can determine that accessing only 3 columns to retrieve 3 columns of data from the copy of the tenant-based subset 110 would be a more efficient utilization of system resources than accessing 24 columns to retrieve 3 columns of data from the base table 100, and therefore create the tenant-based subset 108. Since the copies of the tenant-based subsets 110 and 112, which may be referred to as "skinny tables" or "skinny performance meta-structures," store the same data as the base table 100, any manipulations to the copies of the tenant-based subsets 110 and 112's data that is stored in the base table 100 need to be synchronously replicated in the co-located data that is stored in the copies of the tenant-based subsets 110 and 112. Synchronous replication is required so that when a query optimizer directs a query to retrieve data from any copy of a tenant-based subset, the data retrieved from the copy of the tenant-based subset is the same data as the corresponding data stored in the base table 100. While this example depicts 2 copies of tenant-based subsets 110 and 112 that each store 3 rows of data, the database system's query optimizer can create any number of copies of tenant-based subsets, with each copy of a tenant-based subset storing any number of rows of data. Although each of these examples describe copies of tenant-based subsets 110 and 112 that include data from both standard objects and custom objects, a copy of a tenant-based subset may include data from only standard objects or from only custom objects. When a query optimizer creates a copy of a tenant-based subset, the database system updates the indexes to enable searches based on data that is co-located in the copy of the tenant-based subset. For example, the database system updates the custom index 108 for organization B to enable a search engine that is searching for an object that stores the value "Northwestern" to identify the copies of tenant-based subsets 110 and 112, which store the "John Jones" for the contact's name, "628-444-4444" for the contact's phone number, and either "Northwestern" for the contact's sales region or "Small" for the company's size.

A database trigger can be procedural code that can be automatically executed in response to certain detected events in a database, such as in response to user interactions with a database. For example, a trigger can be a code that is executed before or after detection of various types of database operations are executed, such as insert, update, delete, etc. A trigger can be used to perform a number of automatic actions, such as cascading changes through related tables, enforcing column restrictions, comparing the results of data manipulations, and maintaining the referential integrity of data across a database. For example, when a new record (representing a new worker) is added to an employee's table, a trigger can be actuated to create new records for the new employee in other tables for other employee-related accounting such as: taxes, vacations, and salaries.

A database system can use triggers to synchronously maintain custom indexes and skinny tables as part of the inserts/updates/deletes that manipulate the data in a base table. For example, when the database system processes an instruction to update data in a column of the base table 100, the database system can refer to the custom index metadata 106 to determine whether to synchronously update a column in a custom index and/or a skinny table. Since triggers may perform complex transformations on the data when manipulating data in a base table, substantial amounts of time and effort may be spent on coding and testing triggers, in order to avoid performance degradation. While triggers may have the desirable effect of keeping custom indexes and skinny tables synchronized and transactionally consistent with their base table, triggers also have disadvantages, such as triggers requiring a significant increase in central processor unit(s) utilization, triggers' coding complexity, and needing production downtime to implement changes in trigger code. Additionally, these trigger disadvantages increasingly degrade performance as the numbers and complexities of custom indexes and skinny tables increase. In contrast to the use of triggers, a database system can write the corresponding data in custom indexes/skinny tables in a way which is synchronous with the transaction that writes date to the base tables (writes include new inserts, updates and deletes of data).

BRIEF SUMMARY

In accordance with embodiments, there are provided systems and methods for trigger-free asynchronous maintenance of custom indexes and skinny tables. A database system receives a request to manipulate data in an object in a database table, and determines whether the object in the database table is associated with a user-based data structure. If the object in the database table is associated with the user-based data structure, the database system manipulates the data in the object in the database table and data in an object in an intermediate data table. The database system receives a query, and determines whether the query requests any data that is in the user-based data structure. If the query requests any data that is in the user-based data structure, the database system creates a query result by combining any data that is in the object in the intermediate data table with any requested data that is in the user-based data structure, and outputs the query result.

For example, a multi-tenant database system receives a request to insert the name, phone number, sales region, and company size for a contact named Susan Stevens into organization B's objects in a multi-tenant database table. Since these organization B objects are associated with 2 skinny tables and 1 custom index, the multi-tenant database system synchronously inserts Susan's data into these organization B objects and into an intermediate data table's objects. Before Susan's data can be inserted from the intermediate data table objects into the 1 custom index and the 2 skinny tables, the multi-tenant database system receives a query for data, which includes Susan's data. Since the query requests data that is in the 1 custom index and the 2 skinny tables, the multi-tenant database system inserts Susan's data from the intermediate data table objects into any requested data that is in the 1 custom index and the 2 skinny tables to create a query result, and outputs the query result. The multi-tenant database system maintains the referential integrity of the data across the database for queries, without the disadvantages of triggers.

While one or more implementations and techniques are described with reference to an embodiment in which trigger-free asynchronous maintenance of custom indexes and skinny performance meta-structures is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for trigger-free asynchronous maintenance of custom indexes and skinny performance meta-structures. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for trigger-free asynchronous maintenance of custom indexes and skinny performance meta-structures will be described with reference to example embodiments. The following detailed description will first describe a method for trigger-free asynchronous maintenance of custom indexes and skinny performance meta-structures. Next, an example intermediate data table for trigger-free asynchronous maintenance of custom indexes and skinny performance meta-structures is described.

Figure 2:
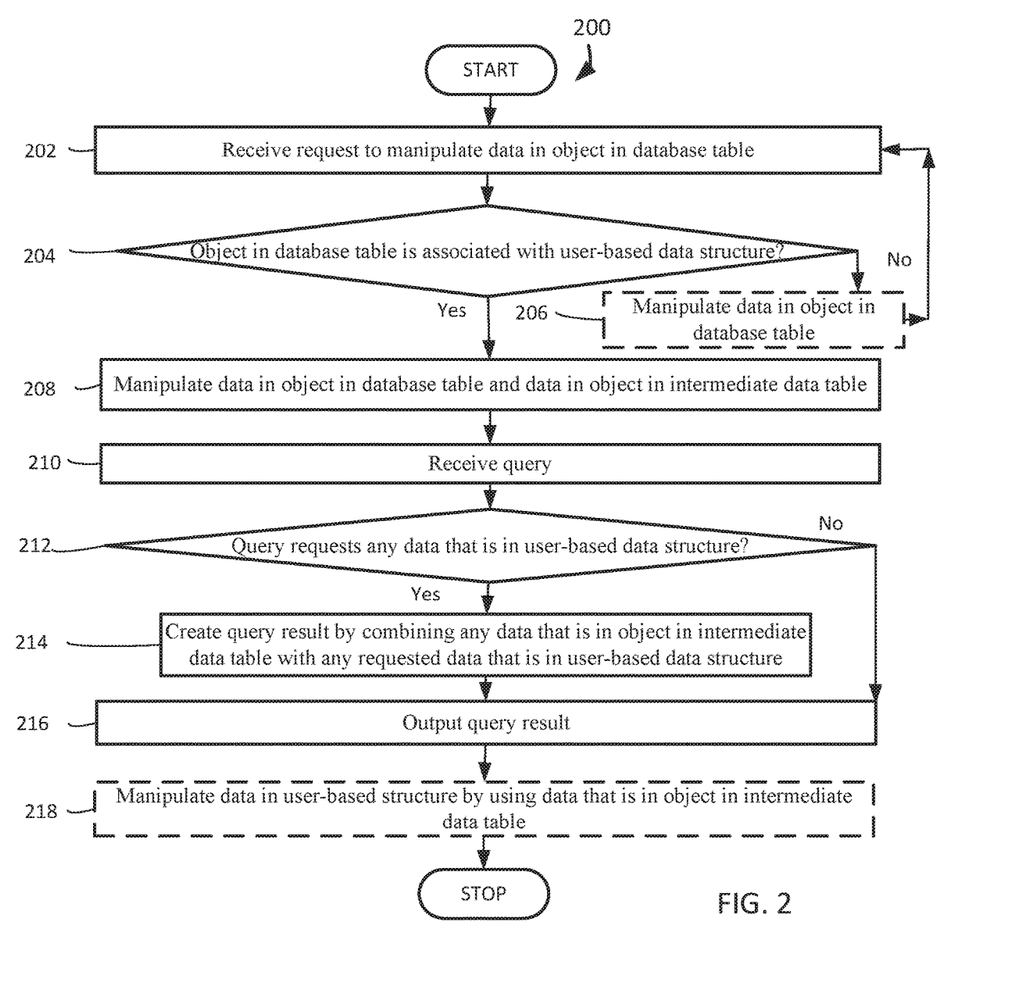
FIG. 2 is an operational flow diagram illustrating a high-level overview of a method for trigger-free asynchronous maintenance of custom indexes and skinny performance meta-structures, in an embodiment.

FIG. 2 is an operational flow diagram illustrating a high-level overview of a method 200 for trigger-free asynchronous maintenance of custom indexes and skinny performance meta-structures. As shown in FIG. 2, a database system may maintain the referential integrity of data across a database.

A request to manipulate data in an object in a database table is received, block 202. The database system maintains the referential integrity of data across a database after the manipulation of data. For example, and without limitation, this can include a multi-tenant database system receiving a request to insert the name, phone number, sales region, and company size for a contact named Susan into organization B's objects in the base table 100. A request can be an act of asking for an action to occur. Manipulating data can be inserting information, deleting information, and/or updating information.

After a request to manipulate data in a database table's object has been received, a determination is made whether the database table's object is associated with a user-based data structure, block 204. The database system maintains the referential integrity of data across a database when data that is also in custom indexes and/or skinny tables is manipulated. By way of example and without limitation, this can include the multi-tenant database system using the custom index metadata 106 that references organization B objects to determine whether the organization B objects targeted by the request to insert Susan's name, phone number, sales region, and company size, are associated with any custom indexes or skinny tables. If the database table's object is not associated with a user-based data structure, the method 200 continues to block 206 to manipulate the data in the database table' object. If the database table's object is associated with a user-based data structure, the method 200 continues to block 206 to manipulate the data in the database table's object and data in an intermediate data table's object.

If a database table's object is not associated with a user-based data structure, data in the database table's object is optionally manipulated, block 206. The database system manipulates data only in the database table because data in custom indexes and/or skinny tables would be unaffected. In embodiments, this can include the multi-tenant database system inserting Tom's data into organization A's objects in the base table 100 because the custom index metadata 106 indicates that organization A's objects are not associated with any skinny tables or any custom indexes. Having manipulated data only in the database table's object, the method 200 returns to block 202 to receive additional requests to manipulate data in the database table's objects.

If a database table's object is associated with a user-based data structure, data in the database table's object and data in an intermediate data table's object are manipulated, block 208. The database system manipulates data in an intermediate data table's objects to subsequently maintain the referential integrity of data across a database. For example, and without limitation, this can include the multi-tenant database system synchronously writing Susan's data into the organization B objects in the base table 100, and into an intermediate data table's objects because the custom index metadata 106 indicates that value 21 of the organization B objects is associated with 1 skinny table 110 and 1 custom index 108. The multi-tenant database system's synchronous manipulation operation is a relatively fast constant time operation regardless of the number of associated custom indexes and/or skinny tables because this manipulation operation targets objects in only 2 data structures, the database table's objects and the intermediate data table's objects. In contrast, not only would a trigger's manipulation operation have targeted objects in 3 data structures in this example, the database table's objects, the 1 custom index' objects, and the 1 skinny table's objects, resulting is a relatively slow operation time, as the number of associated custom indexes and/or skinny tables increases, the number of targeted data structures increases, thereby resulting in manipulation operation times that are relatively slower and slower. An intermediate data table can be an information storing structure that is between two things in time, place, or order.

Figure 3:
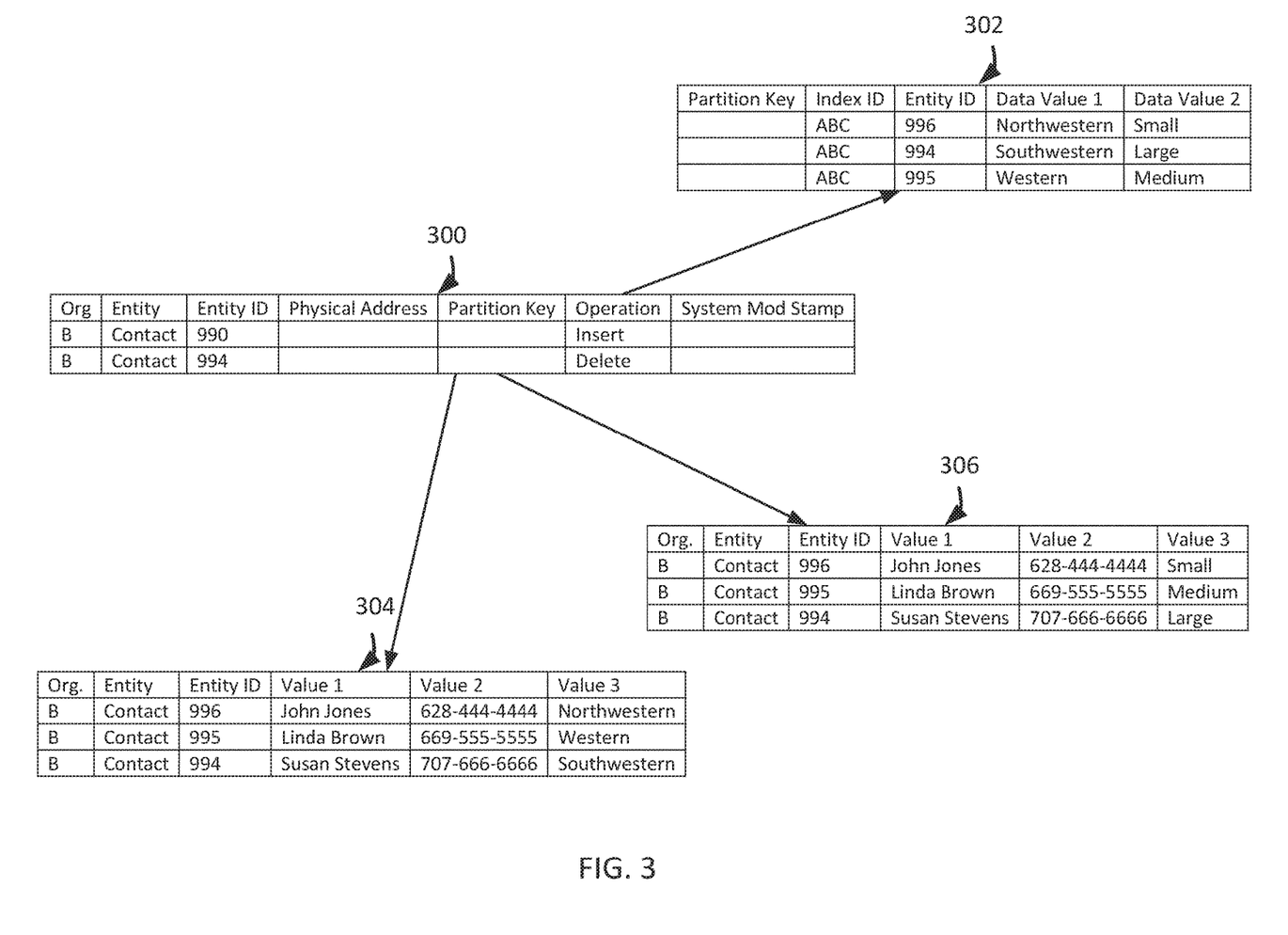
FIG. 3 illustrates a block diagram of a simplified example of an intermediate data table for trigger-free asynchronous maintenance of custom indexes and skinny performance meta-structures, in an embodiment.

FIG. 3 illustrates a block diagram of a simplified example of an intermediate data table 300 for trigger-free asynchronous maintenance of custom indexes and skinny performance meta-structures, in an embodiment. The intermediate data table 300 may be modeled as a domain index on the base table 100, and can be physically designed and positioned such that all related chunks of data are together. A chunk can be a grouping of data that is associated with the same organization (such as organization A, organization B, or organization C), the same entity type (such as contact, lead, account, or opportunity), the same type of request to manipulate data in a database table (such as insert, delete, or update) and a period of time. The period of time is relatively small, such as 3 seconds, and is the time between when the multi-tenant database system manipulated data in an intermediate data table's object and the time when the multi-tenant database system manipulated data in a user-based data structure by using the data in the intermediate table's object, as described below in reference to block 218. The intermediate data table 300 can store the organization identifier, the entity type, the entity identifier, the partition key to determine how to physically store data that is inserted into the intermediate table 300, the physical address or storage identifier, the type of request to manipulate data, and/or the system modification time stamp for each synchronous manipulation of data in the database table's objects and the intermediate data table's objects. The primary key for the intermediate data table 300 may be based on a combination of the organization identifier, the entity type, and the entity identifier. Although this example describes only one intermediate data table 300, the multi-tenant database system may use any number of intermediate data tables, such as one intermediate data table for custom indexes and another intermediate data table for skinny tables.

Having manipulated data in a database table's object and data in an intermediate data table's object, a query is received, block 210. The database system maintains the referential integrity of data across a database for queries. By way of example and without limitation, this can include the multi-tenant database system's database engine or query generator receiving a query for data that includes Susan's data, before Susan's data is inserted from the intermediate table's objects into the 1 custom index 108 and the 1 skinny table 110s. A query can be a request for relevant data.

After receiving a query, a determination is made whether the query requests any data that is in a user-based data structure, block 212. The database system maintains the referential integrity of data across a database for queries that request data from custom indexes and/or skinny tables. In embodiments, this can include the multi-tenant database system's database engine or query generator referencing the custom index metadata 106 to determine whether the query for data that includes Susan's data requests any data that is in any custom index or any skinny table. When the multi-tenant database system receives a query for data that is not stored in custom indexes and/or skinny tables, the most recent data that was manipulated only in the database table's objects would result in the query returning a query result based on the most recent data. When the multi-tenant database system receives a query for data that is also stored in custom indexes and/or skinny tables, the most recent data that was manipulated in the database table's objects and the intermediate data table's objects may not have been manipulated yet from the intermediate data table's objects into the custom indexes and/or skinny tables. Queries received before data is manipulated from the intermediate data table's objects to the custom indexes and/or skinny tables would result in the query returning a query result based on data that differs between the intermediate data table's objects and the custom indexes and/or skinny tables. If a query requests any data that is in a user-based data structure, the method 200 continues to block 214 to combine data to create a query result. If a query does not request any data that is in a user-based data structure, the method proceeds to block 216 to output a query result.

If a query requests any data that is in a user-based data structure, a query result is created by combining any data that is in an intermediate data table's object with any requested data that is in the user-based data structure, block 214. The database system maintains the referential integrity of data across a database for queries by combining data from an intermediate data table's objects with any requested data from custom indexes and/or skinny tables. For example, and without limitation, this can include the multi-tenant database system's database engine or query generator combining Susan's data that is in the intermediate data table objects with any requested data that is in the 1 custom index 108 and the 1 skinny table 110 to create a query result, because the query requested data that is in the 1 custom index 108 and the 1 skinny table 110 and because the request to manipulate data was an insert request. In this example, combining any data that is in an intermediate data table's objects with any requested data that is in a user-based data structure includes inserting data that is in the intermediate data table's objects into any requested data that is in the user-based data structure, because the request to manipulate data in a database table's object was an insert request.

For this example, the query requests the name and phone number for contacts in organization B's western sales region. The multi-tenant database system's query optimizer uses the custom index metadata 106 to determine whether the requested data is in the base table 100 and/or should be in the custom index 108 and/or the skinny tables 110-112. Since the custom index metadata 106 indicates that all of the requested data should be in the skinny table 110, the query optimizer uses the custom index metadata 106 to execute the query on the skinny table 110 by selecting name and phone number where the sales region equals western, resulting in a partial query response of "Linda" and "669-555-5555." However, since the query was received in the 3 second window after Susan's data was inserted in the intermediate table 300 and before data in the intermediate table 300 is inserted into the custom index 108 and the skinny tables 110-112, the query optimizer must combine data in the intermediate table 300 with data in the custom index 108 and the skinny tables 110-112. By combining Susan's data in the intermediate table 300 with the data in the custom index 108, the query optimizer determines that Susan's data includes the specified sales region "Western." After combining Susan's data in the intermediate table 300 with the data in the skinny table 110, the query optimizer uses the combined data for the custom index 108 to identify Susan's name and phone number in the combined data for the skinny table 110. Therefore, the query optimizer combines Susan's name and phone number with Linda's name and phone number to create the query result in response to the query for contact names and numbers in organization B's western region.

If a query requests data that is stored only in an intermediate table's objects, no data is requested from a user-based data structure, such that combining any data that is in the intermediate data table's object with any requested data that is in the user-based data structure results in using data that is stored only in the intermediate table's objects to create the query result. If data that is stored in an intermediate table's objects has already been used to manipulate data in a user-based data structure, no data exists in these intermediate data table objects, such that combining any data that is in the intermediate data table's objects with any requested data that is in the user-based data structure results in using data that is stored only in the user-based data structure to create the query result.

Combining any data that is in an intermediate data table's objects with any requested data that is in a user-based data structure may include deleting data, which corresponds to the data that is in the intermediate data table's objects, from any requested data that is in the user-based data structure, if the request to manipulate the data in the database table's object was a delete request. For example, the multi-tenant database system's database engine or query generator deletes Mary's data, which is stored in the intermediate data table's objects, from any queried data that is in the 1 custom index 108 and the 2 skinny tables 110 and 112 to create a query result, because the query requested data that is in the 1 custom index 108 and the 2 skinny tables 110 and 112, and because the request to manipulate data was a delete request.

Combining any data that is in an intermediate data table's objects with any requested data that is in a user-based data structure may include updating any requested data that is in the user-based data structure data with data in the intermediate data table's objects, if the request to manipulate the data in the database table's object was an update request. For example, the multi-tenant database system's database engine or query generator uses Linda's data, which is stored in the intermediate data table's objects, to update any requested data that is in the 1 custom index 108 and the 2 skinny tables 110 and 112 to create a query result, because the query requested data that is in the 1 custom index 108 and the 2 skinny tables 110 and 112, and because the request to manipulate data was an update request. The multi-tenant database system maintains the referential integrity of data across a database for queries, without the disadvantages of triggers. A query result can be a consequence, effect, or outcome of an information request. Requested data can be queried information.

Having created a query result, the query result is output, block 216. The database system maintains the referential integrity of data across a database for queries. By way of example and without limitation, this can include the multi-tenant database system's database engine or query generator outputting the query result created by combining Susan's data that is in the intermediate data table's objects with any requested data that is in the 1 custom index 108 and the 2 skinny tables 110 and 112.

After data is manipulated in an intermediate data table's objects, data in the user-based data structure is optionally manipulated by using data that is in the intermediate data table's objects, block 218. The database system maintains the referential integrity of data across a database by manipulating data from an intermediate data table's objects into custom indexes and/or skinny tables. In embodiments, this can include the multi-tenant database system using the custom index metadata 106 to insert Susan Stevens' data that is in the intermediate data table's objects into the 1 custom index 302 and the 2 skinny tables 304 and 306, which also reflect the deletion of Mary Davis' data, because Megacorp replaced Mary with Susan. The multi-tenant database system can use data that is in the intermediate data table(s) to manipulate data in the user-based structures on demand, on a periodic basis, and/or in response to any type of system event. The multi-tenant database system selects an entire chunk from the intermediate data table 300, and uses the database table's metadata to manipulate the data in every custom index and skinny table that corresponds to the chunk's data. The multi-tenant database system can synchronously manipulate the data in every custom index and skinny table that corresponds to the chunk's data in an atomic operation. After a chunk has been used to manipulate data in each corresponding custom index and skinny table, the multi-tenant database system deletes the chunk from the intermediate data table 300.

The method 200 may be repeated as desired. Although this disclosure describes the blocks 202-218 executing in a particular order, the blocks 202-218 may be executed in a different order. In other implementations, each of the blocks 202-218 may also be executed in combination with other blocks and/or some blocks may be divided into a different set of blocks.

System Overview

Figure 4:
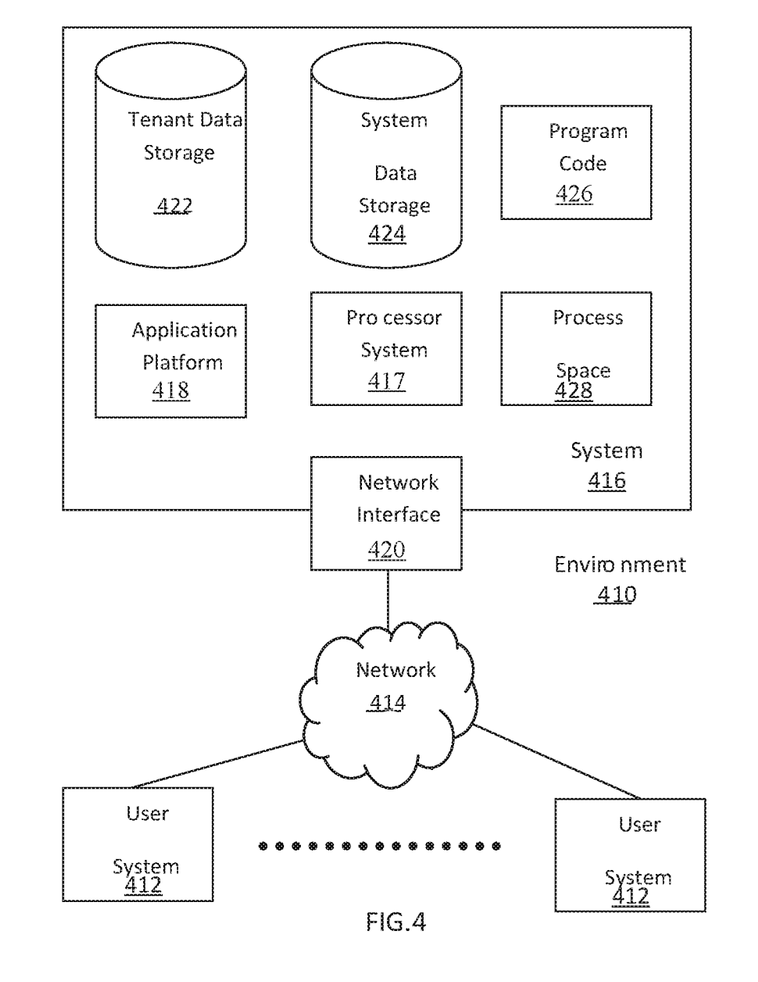
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/ in which can be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/ IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
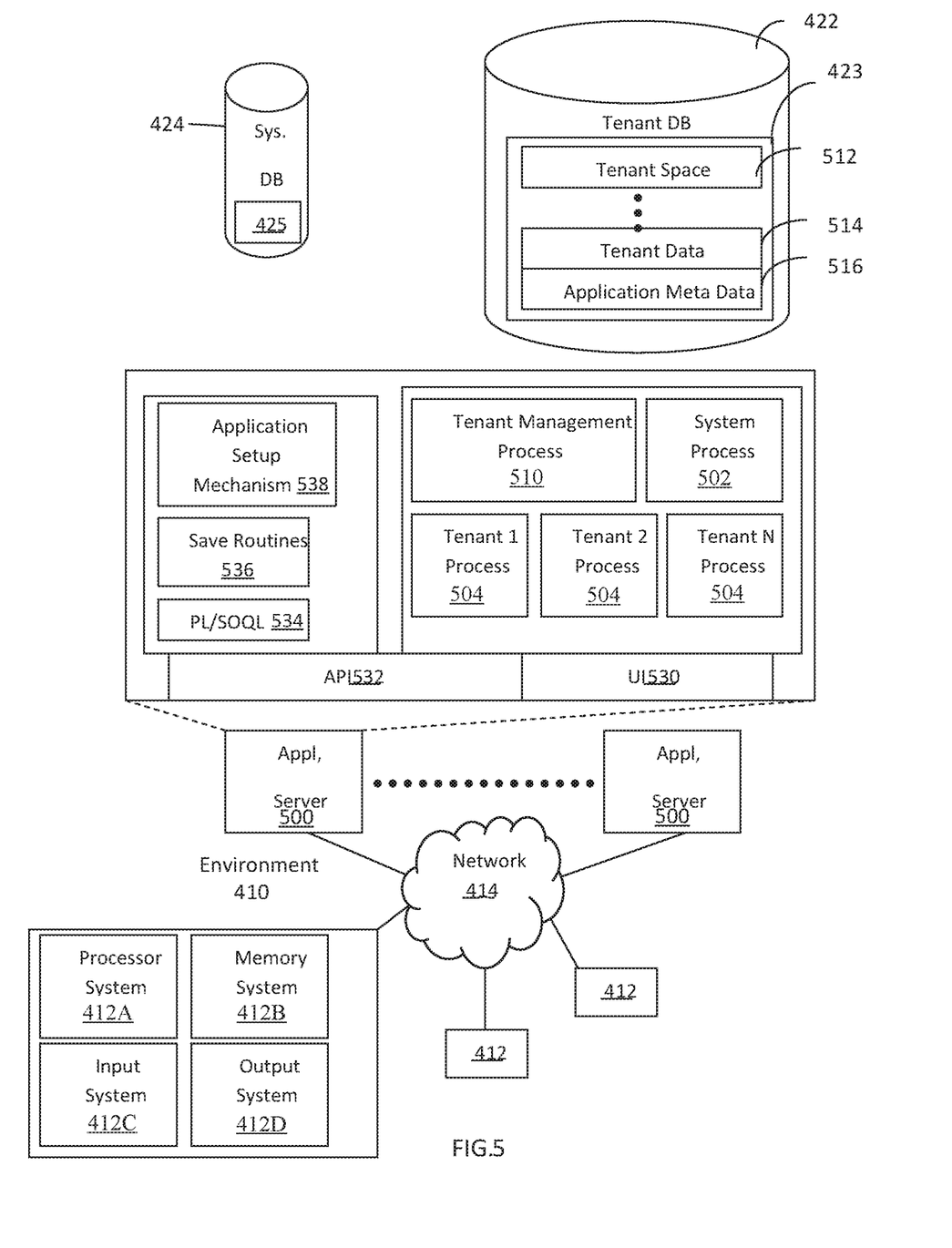
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which can be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server 500$_1$ might be coupled via the network 414 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for trigger-free asynchronous maintenance of custom indexes and skinny performance meta-structures, the system comprising:
   one or more processors; and
   a non-transitory computer readable medium storing a plurality of instructions, which when executed, cause the one or more processors to:
      receive, by the database system, a request to manipulate data in an object in a database table;
      determine, by a database system, in response to the request, that the object in the database table is associated with data in a user-based data structure, the user-based data structure containing a subset of the data in database table;
      perform, by the database system, the requested manipulation of the data in the object in the database table synchronously with performing the same manipulation on data in a corresponding object in an intermediate data table associated with the user-based data structure;
      receive, by the database system, a query requesting data;
      determine, by the database system, that the query requests any data in the user-based data structure;
      query, by the database system, the user-based data structure and the intermediate data table for the requested data;
      create, by the database system, a query result by combining any manipulated data that is in the corresponding object in the intermediate data table with any requested data that is in the user-based data structure; and
      cause, by the database system, the query result to be outputted.

2. The system of claim 1, wherein the user-based data structure comprises at least one of a copy of a tenant-based subset of a multi-tenant database that comprises the database table, and a custom index created to optimize a database search by a user of the database system.

3. The system of claim 1, comprising further instructions, which when executed, cause the one or more processors to manipulate the data in the object in the database table, in response to a determination that the object in the database table is not associated with the user-based data structure.

4. The system of claim 1, wherein combining any data that is in the object in the intermediate data table with any requested data that is in the user-based data structure comprises:
   determining whether the request to manipulate the data in the object in the database table comprises a delete request; and
   deleting data, which corresponds to the data that is in the object in the intermediate data table, from any requested data that is in the user-based data structure, in response to a determination that the request to manipulate the data in the object in the database table comprises the delete request.

5. The system of claim 1, wherein combining any data that is in the object in the intermediate data table with any requested data that is in the user-based data structure comprises:
   determining whether the request to manipulate the data in the object in the database table comprises an insert request; and
   inserting the data that is in the object in the intermediate data table into any requested data that is in the user-based data structure, in response to a determination that the request to manipulate the data in the object in the database table comprises the insert request.

6. The system of claim 1, wherein combining any data that is in the object in the intermediate data table with any requested data that is in the user-based data structure comprises:
   determining whether the request to manipulate the data in the object in the database table comprises an update request; and
   updating any requested data that is in the user-based data structure data with the data that is in the object in the intermediate data table, in response to a determination that the request to manipulate the data in the object in the database table comprises the update request.

7. The system of claim 1, comprising further instructions, which when executed, cause the one or more processors to manipulate, by the database system, data in the user-based structure by using the data that is in the object in the intermediate data table.

8. A computer program product comprising computer-readable program code to be executed by one or more processors when retrieved from a non-transitory computer-readable medium, the program code including instructions to:
   receive, by the database system, a request to manipulate data in an object in a database table;
   determine, by a database system, in response to the request, that the object in the database table is associated with data in a user-based data structure, the user-based data structure containing a subset of the data in database table;
   perform, by the database system, the requested manipulation of the data in the object in the database table synchronously with performing the same manipulation on data in a corresponding object in an intermediate data table associated with the user-based data structure;
   receive, by the database system, a query requesting data;
   determine, by the database system, that the query requests any data in the user-based data structure;
   query, by the database system, the user-based data structure and the intermediate data table for the requested data;
   create, by the database system, a query result by combining any manipulated data that is in the corresponding object in the intermediate data table with any requested data that is in the user-based data structure; and
   cause, by the database system, the query result to be outputted.

9. The computer program product of claim 8, wherein the user-based data structure comprises at least one of a copy of a tenant-based subset of a multi-tenant database that comprises the database table, and a custom index created to optimize a database search by a user of the database system.

10. The computer program product of claim 8, wherein the computer-readable program code comprises further instructions to manipulate the data in the object in the database table, in response to a determination that the object in the database table is not associated with the user-based data structure.

11. The computer program product of claim 8, wherein combining any data that is in the object in the intermediate data table with any requested data that is in the user-based data structure comprises:
   determining whether the request to manipulate the data in the object in the database table comprises a delete request; and
   deleting data, which corresponds to the data that is in the object in the intermediate data table, from any requested data that is in the user-based data structure, in response to a determination that the request to manipulate the data in the object in the database table comprises the delete request.

12. The computer program product of claim 8, wherein combining any data that is in the object in the intermediate data table with any requested data that is in the user-based data structure comprises:
   determining whether the request to manipulate the data in the object in the database table comprises an insert request; and
   inserting the data that is in the object in the intermediate data table into any requested data that is in the user-based data structure, in response to a determination that the request to manipulate the data in the object in the database table comprises the insert request.

13. The computer program product of claim 8, wherein combining any data that is in the object in the intermediate data table with any requested data that is in the user-based data structure comprises:
   determining whether the request to manipulate the data in the object in the database table comprises an update request; and
   updating any requested data that is in the user-based data structure data with the data that is in the object in the intermediate data table, in response to a determination that the request to manipulate the data in the object in the database table comprises the update request.

14. The computer program product of claim 8, wherein the computer-readable program code comprises further instructions to manipulate, by the database system, data in the user-based structure by using the data that is in the object in the intermediate data table.

15. A method for trigger-free asynchronous maintenance of custom indexes and skinny performance meta-structures, the method comprising:
   receiving, by the database system, a request to manipulate data in an object in a database table;
   determining, by a database system, in response to the request, that the object in the database table is associated with a corresponding object in a user-based data structure, the user-based data structure containing a subset of the data in database table;
   performing, by the database system, the requested manipulation of the data in the object in the database table synchronously with performing the same manipulation on data in a corresponding object in an intermediate data table associated with the user-based data structure;
   receiving, by the database system, a query requesting data;
   determining, by the database system, that the query requests any data in the user-based data structure;
   querying, by the database system, the user-based data structure and the intermediate data table for the requested data;
   creating, by the database system, a query result by combining any manipulated data that s in the corresponding object in the intermediate data table with any requested data that is in the user-based data structure; and
   causing, by the database system, the query result to be outputted.

16. The method of claim 15, wherein the user-based data structure comprises at least one of a copy of a tenant-based subset of a multi-tenant database that comprises the database table, and a custom index created to optimize a database search by a user of the database system.

17. The method of claim 15, the method further comprising manipulating the data in the object in the database table, in response to a determination that the object in the database table is not associated with the user-based data structure.

18. The method of claim 15, wherein combining any data that is in the object in the intermediate data table with any requested data that is in the user-based data structure comprises:
   determining whether the request to manipulate the data in the object in the database table comprises a delete request; and
   deleting data, which corresponds to the data that is in the object in the intermediate data table, from any requested data that is in the user-based data structure, in response to a determination that the request to manipulate the data in the object in the database table comprises the delete request.

19. The method of claim 15, wherein combining any data that is in the object in the intermediate data table with any requested data that is in the user-based data structure comprises:
   determining whether the request to manipulate the data in the object in the database table comprises an insert request;
   inserting the data that is in the object in the intermediate data table into any requested data that is in the user-based data structure, in response to a determination that the request to manipulate the data in the object in the database table comprises the insert request;
   determining whether the request to manipulate the data in the object in the database table comprises an update request; and
   updating any requested data that is in the user-based data structure data with the data that is in the object in the intermediate data table, in response to a determination that the request to manipulate the data in the object in the database table comprises the update request.

20. The method of claim 15, the method further comprising manipulating, by the database system, data in the user-based structure by using the data that is in the object in the intermediate data table.

* * * * *